United States Patent
Alsbury et al.

(10) Patent No.: US 8,228,330 B2
(45) Date of Patent: Jul. 24, 2012

(54) SYSTEM AND METHOD FOR DISPLAYING BAR CHARTS WITH A FIXED MAGNIFICATION AREA

(75) Inventors: Quinton Alsbury, Venice, CA (US); David Becerra, Venice, CA (US); Claire B. Remillard, San Diego, CA (US); Brett Callaghan, San Diego, CA (US)

(73) Assignee: MeLLmo Inc., Solana Beach, CA (US)

( * ) Notice: Subject to any disclaimer, the term of this patent is extended or adjusted under 35 U.S.C. 154(b) by 597 days.

(21) Appl. No.: 12/363,704

(22) Filed: Jan. 30, 2009

(65) Prior Publication Data

US 2010/0194754 A1   Aug. 5, 2010

(51) Int. Cl.
G06T 11/20   (2006.01)
(52) U.S. Cl. ........................................... 345/440
(58) Field of Classification Search .................. 345/440
See application file for complete search history.

(56) References Cited

U.S. PATENT DOCUMENTS

| | | | |
|---|---|---|---|
| 5,895,906 A * | 4/1999 | Danielson et al. | 235/462.45 |
| 5,956,658 A * | 9/1999 | McMahon | 702/83 |
| 7,089,096 B2 * | 8/2006 | Liebl et al. | 701/29 |
| 7,451,405 B2 * | 11/2008 | Sylthe et al. | 715/800 |
| 7,865,215 B2 * | 1/2011 | Bells et al. | 455/566 |
| 2002/0126318 A1 * | 9/2002 | Katayama | 358/402 |
| 2004/0008191 A1 * | 1/2004 | Poupyrev et al. | 345/184 |
| 2005/0275622 A1 * | 12/2005 | Patel et al. | 345/156 |
| 2006/0001647 A1 | 1/2006 | Carroll | |
| 2006/0055693 A1 * | 3/2006 | Sylthe et al. | 345/419 |
| 2006/0070013 A1 * | 3/2006 | Vignet | 715/854 |
| 2007/0271500 A1 * | 11/2007 | Theophil et al. | 715/503 |
| 2008/0109175 A1 * | 5/2008 | Michalak | 702/50 |
| 2008/0192056 A1 * | 8/2008 | Robertson et al. | 345/440 |
| 2008/0316225 A1 * | 12/2008 | Sylthe et al. | 345/620 |
| 2009/0006427 A1 * | 1/2009 | Veeraraghavan et al. | 707/100 |
| 2009/0034800 A1 * | 2/2009 | Vau et al. | 382/107 |
| 2009/0119580 A1 * | 5/2009 | Rohrabaugh et al. | 715/249 |
| 2009/0183068 A1 * | 7/2009 | Bard | 715/252 |
| 2010/0079463 A1 * | 4/2010 | Rabin | 345/440 |
| 2010/0083306 A1 * | 4/2010 | Dempski et al. | 725/34 |
| 2010/0128007 A1 * | 5/2010 | Cole | 345/184 |
| 2010/0214300 A1 * | 8/2010 | Alsbury et al. | 345/440.2 |
| 2010/0251151 A1 * | 9/2010 | Alsbury et al. | 715/765 |
| 2010/0293056 A1 * | 11/2010 | Flynt et al. | 705/14.58 |
| 2011/0037727 A1 * | 2/2011 | Lee et al. | 345/174 |
| 2011/0199484 A1 * | 8/2011 | Uchihara | 348/143 |

OTHER PUBLICATIONS

PCT International Search Report, PCT Application No. PCT/US2010/22422, Mar. 10, 2010, 7 pages.

* cited by examiner

*Primary Examiner* — Javid A Amini
(74) *Attorney, Agent, or Firm* — Fenwick & West LLP

(57) ABSTRACT

A system and a method are disclosed for visually displaying data points using charts on a display screen with limited display area. A fixed magnification area allows presentation of detailed information for some data points compared to other data points that are displayed. The chart can be moved relative to the fixed magnification area thereby changing the data points displayed within the fixed magnification area that present additional information. The relative movement between the chart and the fixed magnification area is triggered by different kinds of inputs from the user including, tilting of the device, swiping with a pointing device and selecting a particular data point.

30 Claims, 13 Drawing Sheets

SYSTEM AND METHOD FOR DISPLAYING BAR CHARTS WITH A FIXED MAGNIFICATION AREA

FIELD OF ART

The disclosure generally relates to displaying reports on a device having a display area that is small relative to the amount of data that is being displayed.

DESCRIPTION OF THE RELATED ART

There are several ways of using charts or graphs to visually present statistical data available in reports including, for example, bar charts, pie charts, line graphs, and scatter graphs. On a mobile device such as a handheld device, handheld computer, cell phone, tablet computer, or personal digital assistant (PDA), graphs and charts have to be displayed on small display screens with display areas that are limited in size compared to the data being shown. There are several challenges in trying to show graphs and charts on such devices. For example, FIG. 1 illustrates some of the obstacles encountered in displaying a bar chart on a small screen. In FIG. 1, the x-axis 105 shows alphanumeric values representing names of states and the y-axis 110 shows numeric values associated with a characteristic of states, for example, the land area of the state. The height of each bar 115 in the bar chart is proportional to the y-coordinate value represented by the bar. Due to the fixed resolution of typical display screens 100, two values that are very close may be represented by bars appearing to have the same height. Hence, the height of the bars 115 may not truly represent the corresponding y-coordinate value. In addition, it is difficult for a viewer to know the exact y-coordinate value corresponding to each bar. FIG. 1 also illustrates the problem that a large portion of the display area is used to show the labels corresponding to the possible values of x and y coordinates, thereby consuming display area that could have been used to show the bars.

SUMMARY

The present invention enables the display of chart type data on a device having a display area that is small compared to the amount of data being shown in the chart. Examples of suitable devices include tablet computers, smart phone devices, and mobile phones. A magnification area allows a portion of a chart or graph data to be displayed at a larger size and to include additional information compared to the graphic data displayed outside of the magnification area. The location of either the chart or the magnification area can be moved to view detailed information for different portions of the chart. Navigation mechanisms allow a user to efficiently reach a particular data point that the user wants to magnify.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
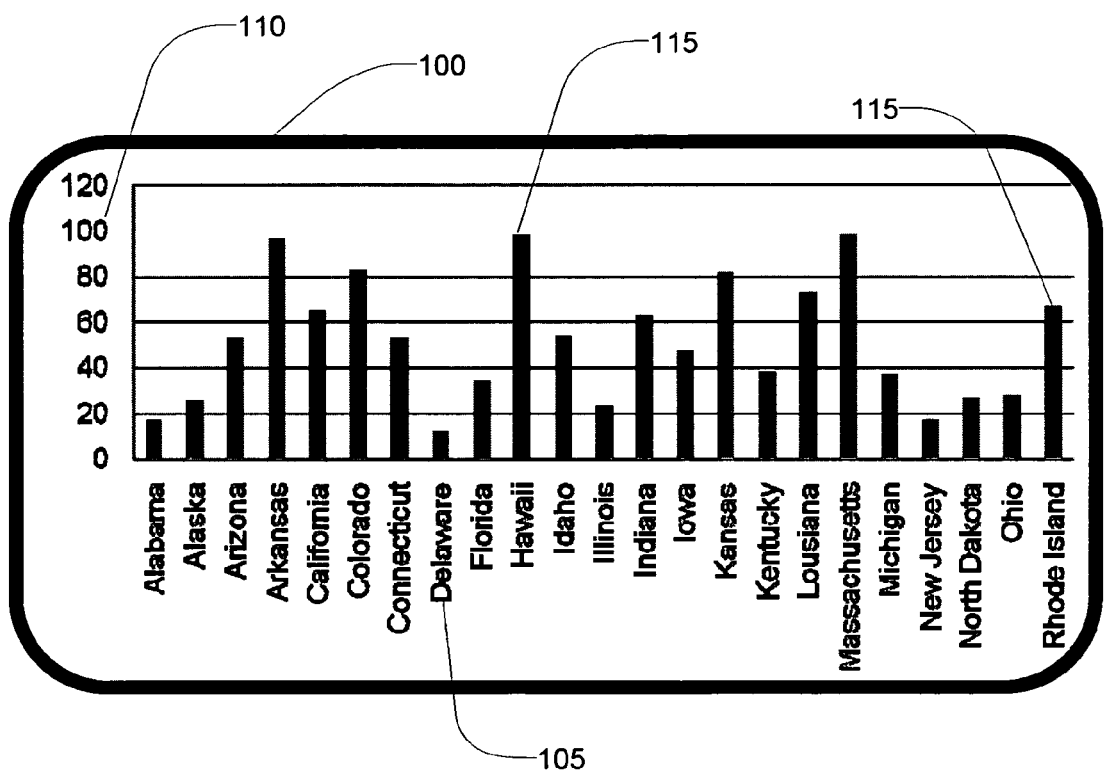
FIG. 1 illustrates a conventional system displaying a bar graph.
Figure 2:
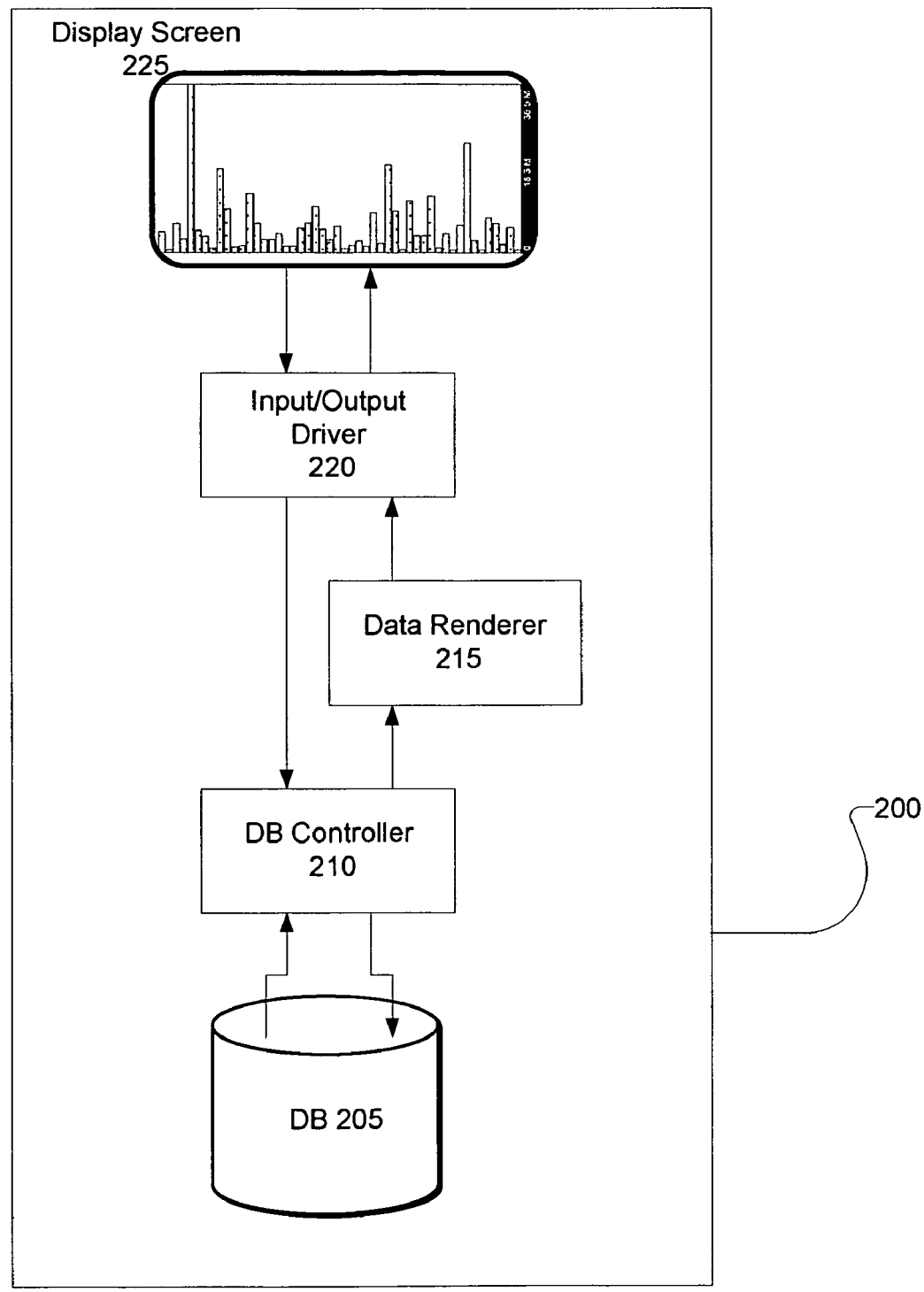
FIG. 2 illustrates one embodiment of the architecture of a system for displaying data as bar graphs.

FIG. 2 is a block diagram of a system architecture of a device in accordance with one embodiment. The device 200 includes a database (DB) 205, a DB controller module 210, a data renderer module 215, a input/output (IO driver) module 220, and a display screen 225. As used herein, the term "module" refers to a computer program logic and/or data for providing the specified functionality. A module can be implemented in hardware, firmware, and/or software. Examples of types of devices 200 shown in FIG. 2 include tablet computers, smart phone devices, and mobile phones.

The DB 205 stores data and metadata associated with reports. The DB 205 in one embodiment is implemented using a hard disk drive but can also be implemented using any other device capable of storing data, such as a writeable compact disc (CD) or DVD, or a solid state memory device, for example a flash memory. The DB controller module 210 implements the logic to interface with the DB 205 so as to read data from the DB 205 or write data to the DB 205. The DB controller 210 provides data to the data renderer module 215, which computes information required for rendering the data. For example, the data renderer can determine the dimensions of a pie chart if the data needs to be displayed as a pie chart. The data and the information necessary for rendering the data are provided by the data renderer 215 to the input/output driver 220. The input/output driver 220 provides the display screen 225 with instructions and data necessary for displaying data and/or images. In various embodiments, the display screen 225 is used to input data and/or commands. For example, a touch sensitive screen can sense the coordinates of the portion of the screen touched by a user. The user may touch the display screen 225, for example, to select a command from a list of commands or to select a data element from a list of data elements displayed on the screen. In various embodiments, the display screen 225 can be tilted by the user. The magnitude and direction of tilt of the display screen 225 is detected and can be treated as an input. The angle of the tilt of the display screen is provided to the input/output driver 220 by hardware components such as an accelerometer. In some embodiments, a pointing device, such as a thumbwheel, mouse, track ball, or other type of pointing device is used to input data or commands into the system. The input/output driver 220 sends the data or instructions provided by the display screen 225 to the DB controller 210. The DB controller 210 in response to data or instructions received from the input/output driver 220 reads data from DB 205 and writes data to DB 205.

A mobile device may be used to view reports available to a user. An example scenario allows the user to associate a particular report with a display mode, such as a pie chart, bar chart, or text mode. To allow the user to create an association between the report and a display mode, the user is presented with a list of display modes. The user may make a selection by touching the appropriate portion of the display screen 225 showing a specific mode of display, or by providing input through another mechanism such as a keyboard or pointing device. The DB controller 210 updates the metadata of the appropriate report in the DB 205 to store the information related to mode of display of the report. The information associating the report with a mode of display is used subsequently to display the report.

In another scenario, the user may be presented with a list of reports that can be reviewed. The user selects a particular report name and data renderer 215 computes information to render the data, which is then displayed on display screen 225 in the specified format. Various other scenarios of interactions between the user and the various components and modules displayed in FIG. 2 are possible.

Figure 3:
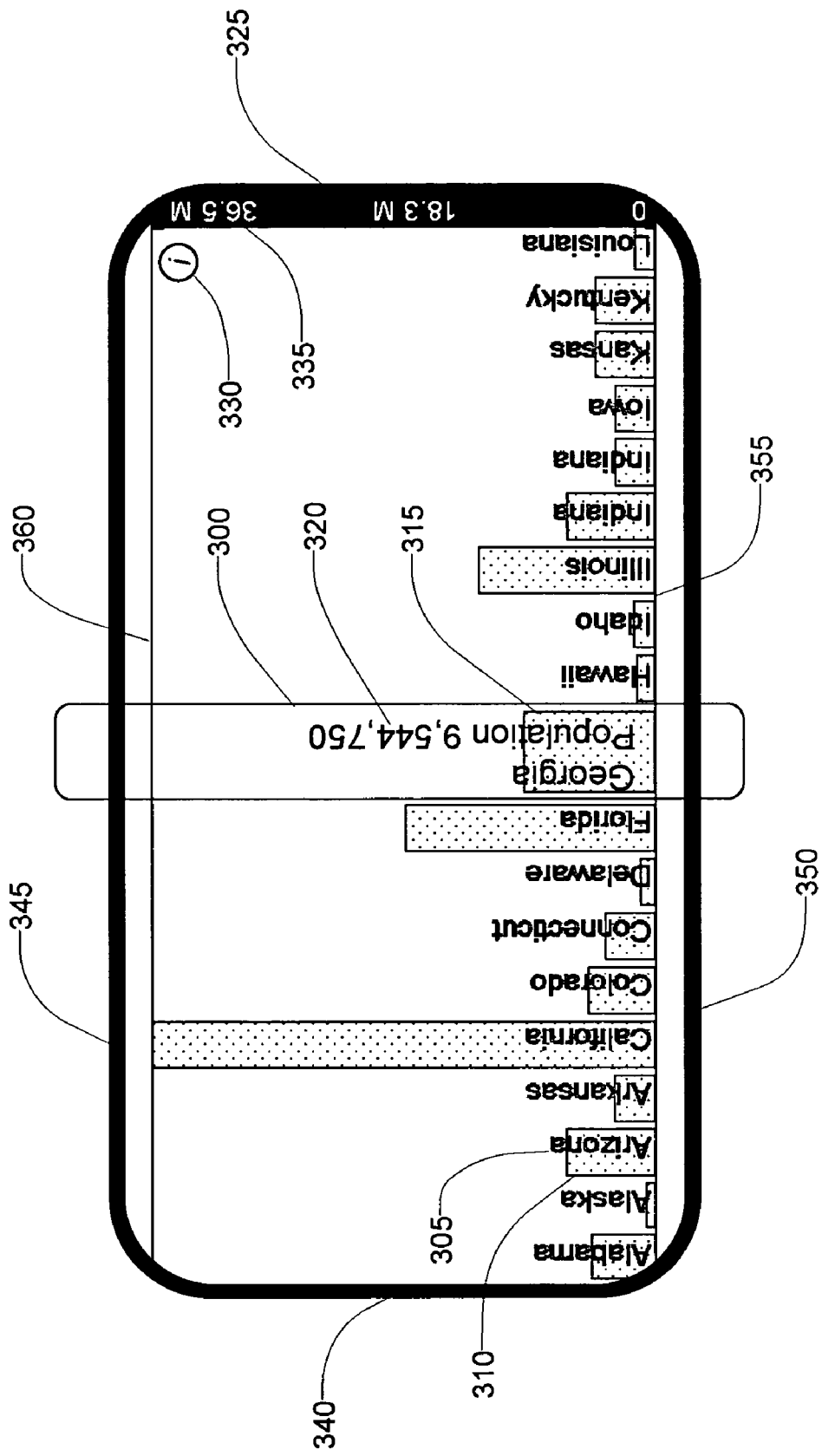
FIG. 3 shows how a fixed magnification area can be used to display a bar graph on a screen with limited display area.

FIG. 3 illustrates how a fixed magnification area 300 can be used on a display screen 225 to effectively present a visual representation of a report such as a bar chart. The display screen comprises four edges, a left edge 340, a right edge 325, a top edge 345, and a bottom edge 350. Note that the naming of an edge, e.g., as a "bottom", is for clarity of description—a particular device may support use in multiple orientations, in which case the physical edge of the device that is the "bottom" or "top" in one orientation can easily become a different edge in an alternative orientation. Our description here is not intended to be limited to a particular orientation.

The x-axis is shown adjacent to the bottom edge 350 and the values 335 corresponding to the y-axis are shown adjacent to the right edge 325. The chart is displayed in an area enclosed within the edges of the display screen. For example, in FIG. 3 the chart area is within the lower chart edge 355 and an upper chart edge 360. A bar displayed within the fixed magnification area 300 is called a magnified bar 315 and a bar displayed outside the fixed magnification area 300 is called a standard bar 310. The magnified bar 315 can display more information 320 related to the data point corresponding to the bar compared to a standard bar. The x-axis values 305 are shown overlaid on the bars with each standard bar 310 having a height representing its corresponding y-value. In one embodiment, the fixed magnification area 300 is a rectangular area with height at least as large as the maximum bar height in the graph and a width larger than a standard bar 3 10. The width of the magnified bar 315 is larger than the width of a standard bar 310 to allow additional information to be displayed for the bar being magnified. For example, in FIG. 3, the text 320 "Georgia Population 9,544,750" is displayed for the magnified bar 315. The text 320 "Georgia Population 9,544,750" comprises the text representation of the y-coordinate value corresponding to the bar "9,544,750" as well as the keyword "Population" that provides additional information for the data being displayed. In one embodiment, the fixed magnification area may be sufficiently wide to display more than one magnified bar 315. In some embodiments, an information button 330 can be selected by the user to see additional information that may not be presented on the display screen, for example, a description of the chart.

To magnify different bars to see additional information, the user is provided with mechanisms to move the bar chart relative to the fixed magnification area 300. This may involve either keeping the fixed magnification area 300 stationary and moving the chart, or keeping the chart stationary while moving the fixed magnification area 300, or moving both. For example, the user can swipe along the x-axis shown in FIG. 3 causing the bar chart to move along the x-axis while the fixed magnification area 300 is stationary. As the bar chart moves relative to the fixed magnification area 300, different bars pass through the fixed magnification area 300. Each bar that passes under the fixed magnification area 300 displays additional information compared to bars outside the fixed magnification area 300. A magnified bar 315 that is moved outside the fixed magnification area 300 becomes a standard bar 310. Similarly, a standard bar that moves into the fixed magnification area 300 displays additional information and becomes a magnified bar 315. For example, if the bar chart in FIG. 3 is moved from left to right, the bar corresponding to Florida passes under the fixed magnification area 300, followed by Delaware, followed by Connecticut and so on. As the bar to the left of Georgia, i.e., Florida enters the fixed magnification area 300, the bar corresponding to Georgia moves outside the fixed magnification area 300. This causes the bar corresponding to Georgia to be displayed as a standard bar and the bar corresponding to Florida to be displayed as a magnified bar. In one embodiment, the transition from a standard bar to a magnified bar is animated to display bars of different sizes in between the standard bar size and the magnified bar size. Another embodiment displays the transition directly from the standard bar to the magnified bar or from magnified bar to standard bar without displaying any intermediate stages. In one embodiment, the user can customize the animation settings; alternatively they may be determined automatically according to device type or graphical capabilities.

Input from the user may move the bar chart such that two neighboring bars are each only partially under the fixed magnification area 300. The fixed magnification area 300 may not be wide enough to display two magnified bars simultaneously. In this case, the bar chart is further moved relative to the fixed magnification area 300 without any additional input provided by the user to cause a single bar to stay under the fixed magnification area 300 causing the other bar to move out of the fixed magnification area 300. In effect, when the chart is moved relative to the fixed magnification area 300 causing two partial bars to overlap the fixed magnification area 300, the fixed magnification area 300 pulls in one of the two bars, moving the other bar. In one embodiment, the bar that is pulled in may be the bar that has bigger overlap with the fixed magnification area 300 along the x-axis. In another embodiment, the bar pulled in may be the bar that would have fully moved into the fixed magnification area 300 anyway if the bar chart had continued moving along its previous direction.

Figure 4:
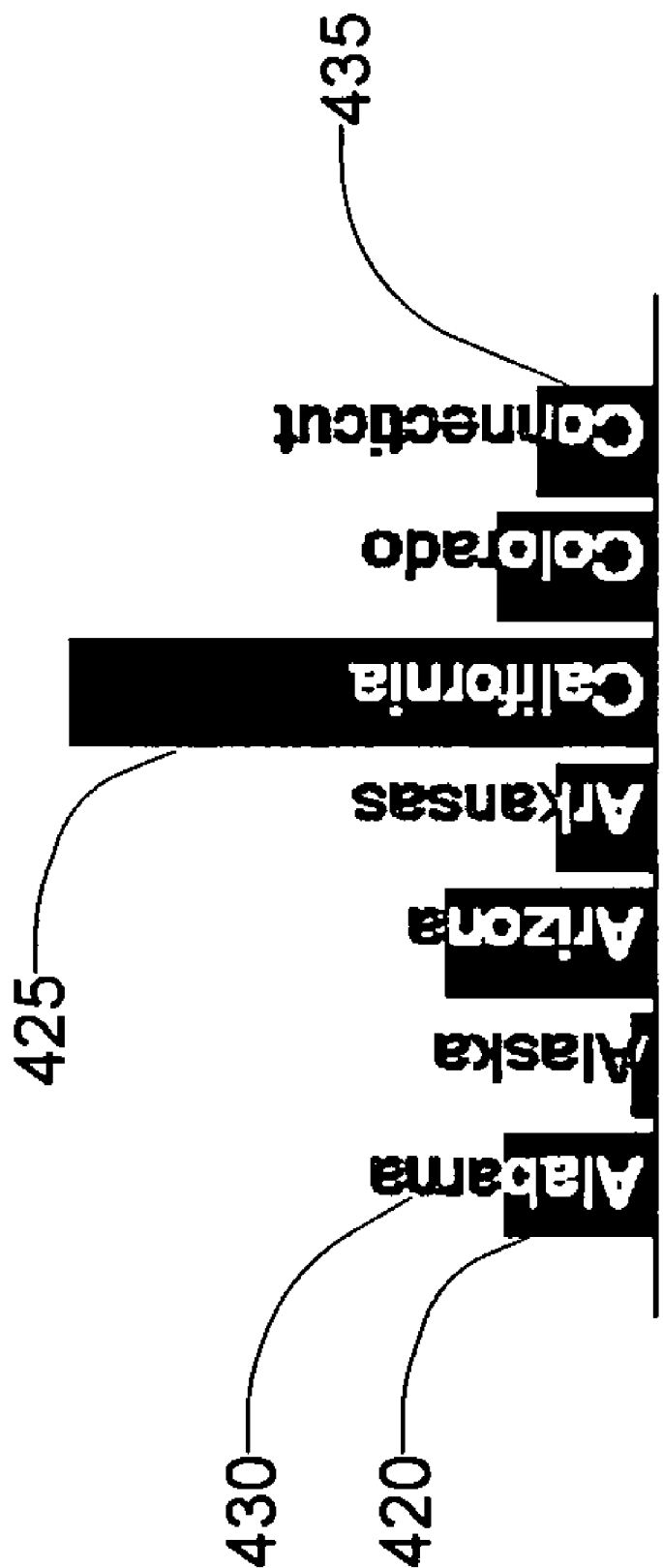
FIG. 4 shows an embodiment of a graphical display showing labels in a bar graph.

FIG. 4 illustrates how the labels corresponding to the x-axis values are displayed in one embodiment. As shown in FIG. 4, the labels 430 for the different x-coordinate values are shown above the line displaying the x-axis 420 and parallel to the y-axis. Depending on the value of the y-coordinate and the size of the text corresponding to the x-coordinate value, the bar may be taller than the label or shorter than the label. For example, bar 425 is an example of the bar being taller than the label whereas 435 is an example of a bar shorter than the label. The portion of the label 430 that overlaps with the bar is displayed in inverse or other color that makes it easy to view the text within the bar, for example, the letters "Alab" corresponding to the x-coordinate value Alabama are displayed using white colored text against the dark background of the color of the bar. The portion of the label 430 that extends beyond the bar height is displayed using a color that distinguishes it against the background of the bar chart, for example, the text "ama" that forms the suffix of label 430 Alabama is displayed using a dark color against the light background of the bar chart.

Figure 5:
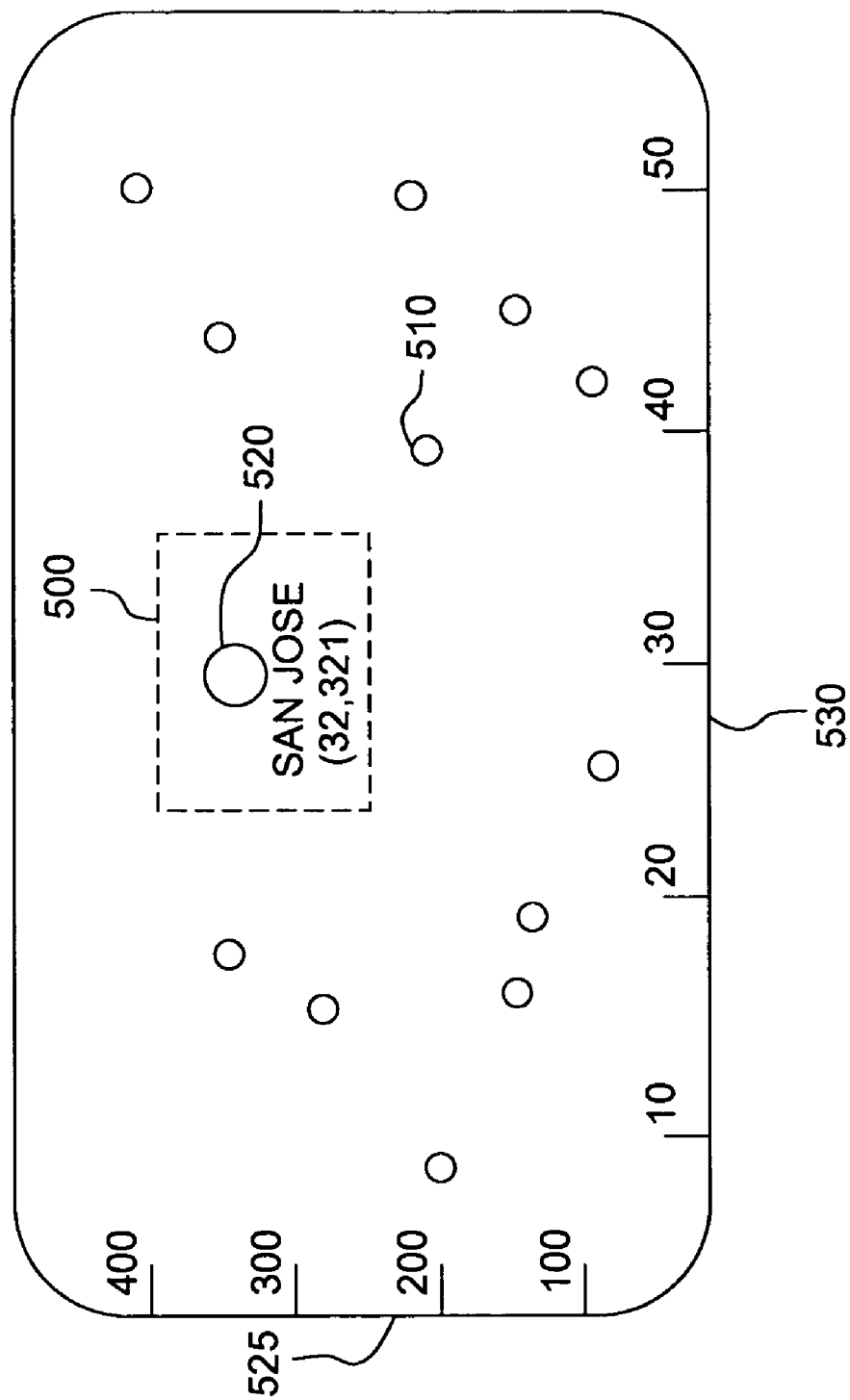
FIG. 5 illustrates how a scatter graph can be displayed effectively using a fixed magnification area.

The fixed magnification area can be used with other kinds of charts, for example, line charts, two dimensional charts displaying data points such as a scatter plot. FIG. 5 shows a two dimensional chart displaying data points with a fixed magnification area 500. The chart in FIG. 5 can be moved relative to the fixed magnification area 500 along both x-axis and y-axis. As shown in FIG. 5, the magnified data point 520 within the fixed magnification area 500 shows additional information compared to a standard data point 510 outside the fixed magnification area 500. The shape of a fixed magnification area for a particular kind of chart is determined based on the shape of the underlying chart to provide a better viewing experience for the user. For example, the shape of a fixed magnification area for a circular chart such as a Smith chart may be circular or rectangular. The shape of the fixed magnification area 500 in FIG. 5 is suitable for displaying data points on a two-dimensional scatter graph and is typically different from the shape of fixed magnification area 300 in FIG. 3 suitable for displaying bar charts The fixed magnification area 500 may be positioned in the center of the display screen and can be repositioned by the user. The user can indicate the direction of movement of the chart relative to the fixed magnification area 500, for example, by tilting the device along the x-axis 530 or y-axis 525 or an angle between the two axes. Based on the angle of tilt, the direction of movement of the chart is determined. Alternatively, the user can indicate the desired direction of chart movement by swiping across the screen in the desired direction.

Figure 6:
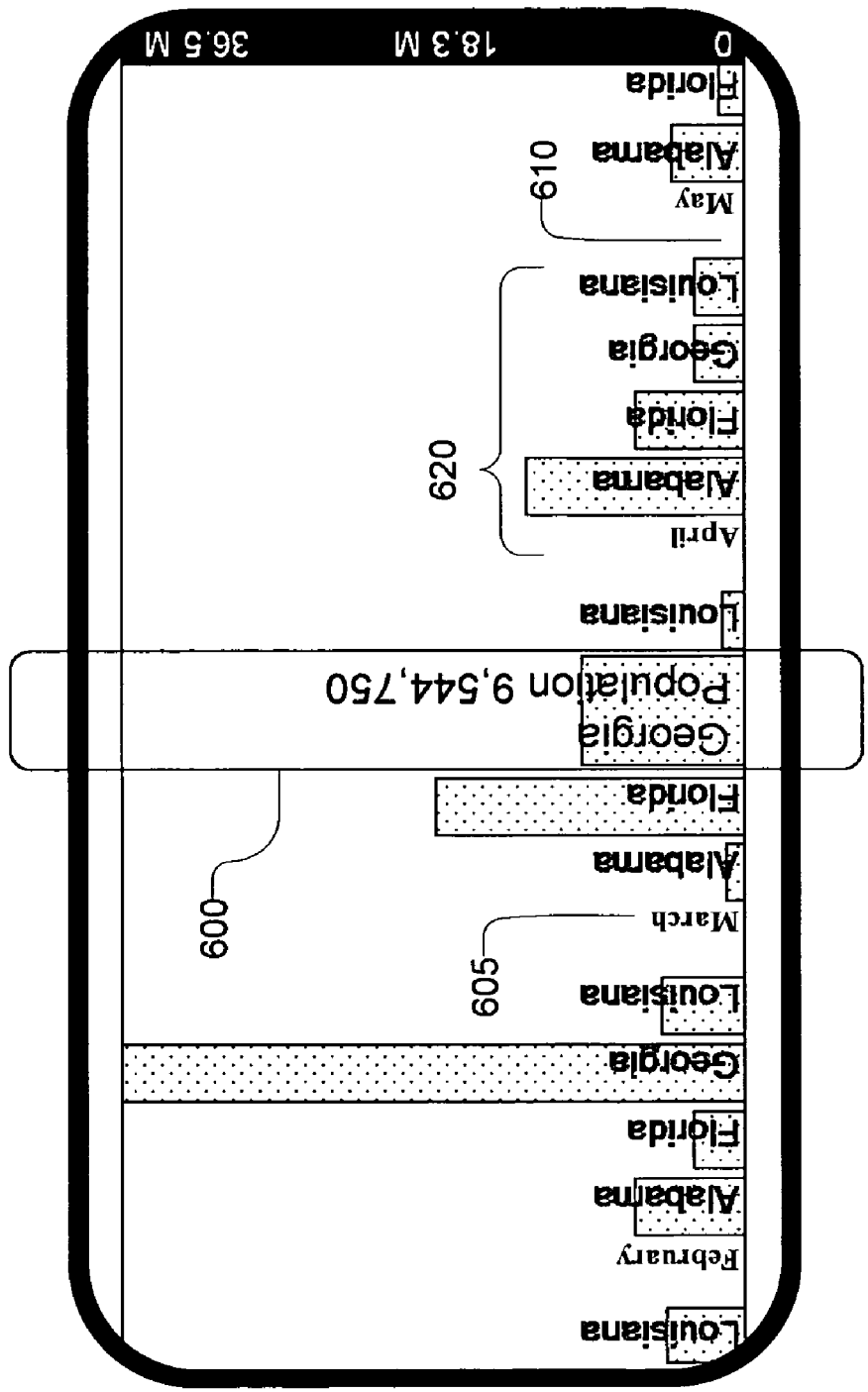
FIG. 6 illustrates how a fixed magnification area can be used to display multi-series charts.

In one embodiment, multi-series bar charts are displayed using a fixed magnification area. A multi-series bar chart displays multiple bars corresponding to each x-coordinate value. The bars 620 for an x-coordinate value are displayed adjacent to each other as shown in FIG. 6. The fixed magnification area 600 provides additional information for magnified bars. In one embodiment, a gap 610 equal to one standard bar width is maintained between two sets of bars corresponding to two adjacent x-coordinate values. This allows the label 605 corresponding to the x-coordinate value to be displayed adjacent to the set of bars corresponding to the x-coordinate value. In some embodiments, the fixed magnification area 600 is wide enough to display all the bars associated with an x-coordinate value. For example, the entire set of bars corresponding to a month along the x-axis may be displayed within the fixed magnification area 600.

The user can navigate across different parts of a chart to magnify and view details with the help of fixed magnification area 300. The user is able to bring different parts of the chart under the fixed magnification area 300 by providing input that causes the chart to move relative to the fixed magnification area 300.

Figure 7:
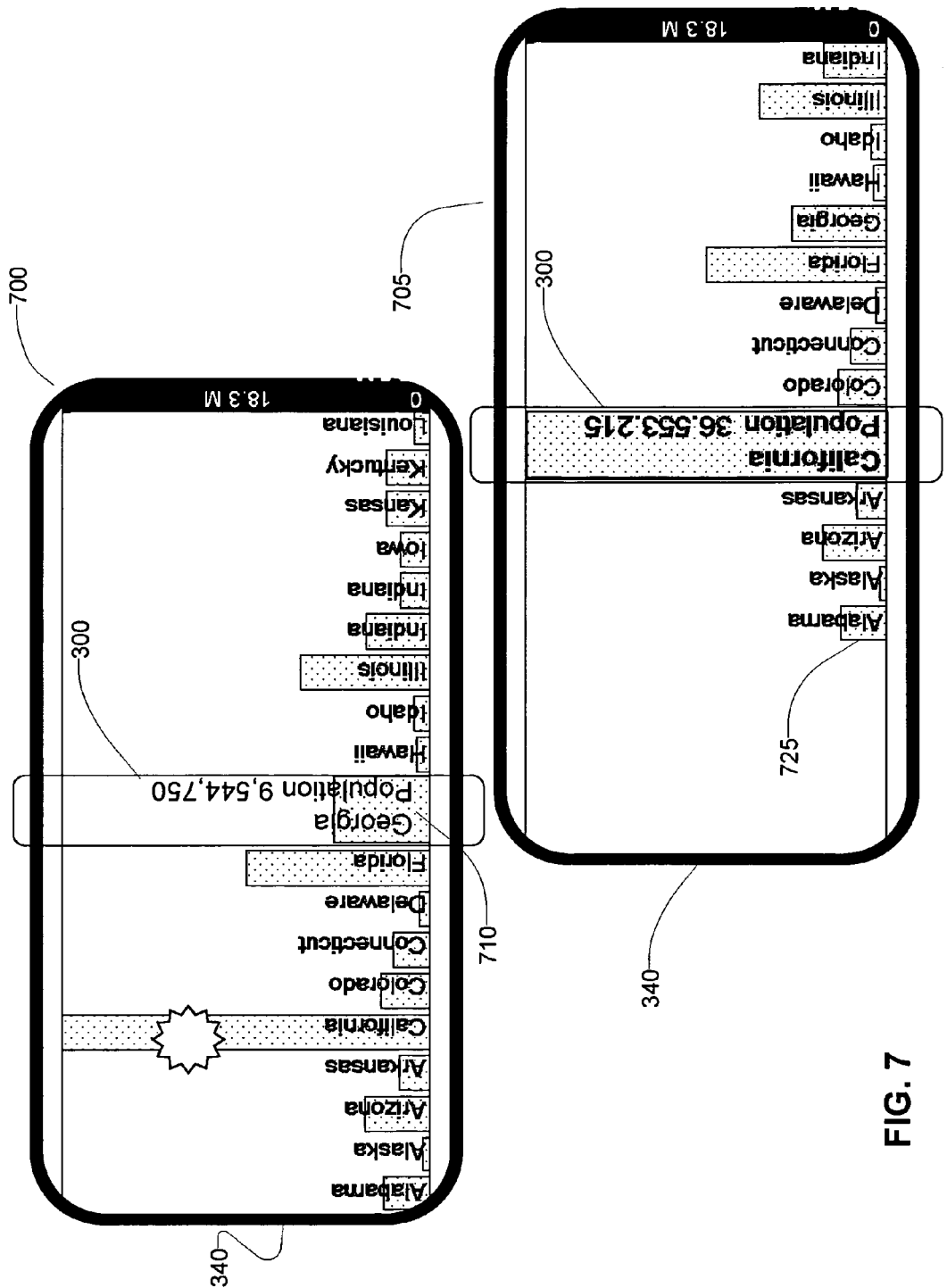
FIG. 7 illustrates how a user can select a particular bar in the bar graph to cause the bar to be displayed under the fixed magnification area.
Figure 8:
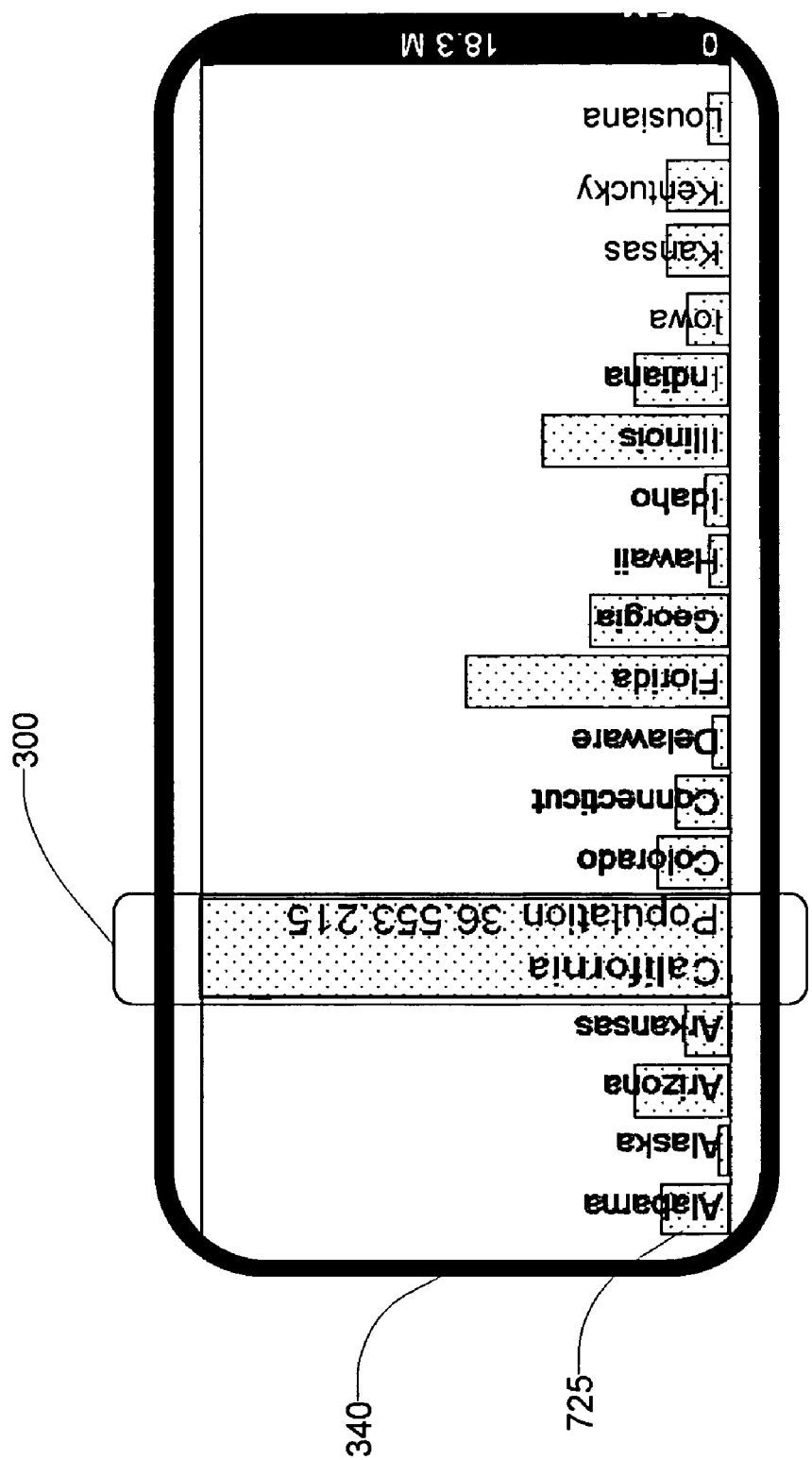
FIG. 8 illustrates how the fixed magnification area can be positioned to eliminate empty space at the end of the chart.

For example, FIG. 7 illustrates how in one embodiment a standard bar displayed on the display screen 225 can be brought under the fixed magnification area 300 by clicking on an area 715 where the standard bar is displayed. The screen shots of the display area before 700 and after 705 are shown indicating how the bar chart is moved based on the user input to display a different bar under the fixed magnification area 300. In an alternative embodiment, the fixed magnification area 300 may be moved to the standard bar selected by the user and the bar chart kept stationary in order to magnify bar selected. The screenshot 705 shows empty space to the left of the standard bar 725. To avoid such empty space, in one embodiment, both the bar chart and the fixed magnification area 300 are moved to bring the standard bar under the fixed magnification area 300 and still avoid showing empty space beyond the chart boundaries. In this case, as shown in FIG. 8, the fixed magnification area 300 is positioned closer to the left edge 340 so as to cause the bar 725 to be displayed adjacent to the left edge 340.

For charts that are bigger than the display area, not all bars are visible at the same time on the display screen 225 for the user to select. The user is provided with mechanisms to scroll the bar chart to see parts of the bar chart outside the display area. One embodiment allows the user to scroll the bar chart by selecting a standard bar and dragging the bar with a swiping motion of the pointing/selecting device in a particular direction. Another embodiment allows the user to swipe across any area of the display screen to scroll the bar chart. The direction of swiping indicates the direction in which the user wants the bar chart to scroll. In some embodiments, the distance the bar chart moves is determined by the distance of the swiping motion by the user. In another embodiment the distance the bar chart moves is determined by the speed of the swiping motion, such that swiping faster causes the bar chart to move larger distances. In yet another embodiment, the swiping action by the user may cause the bar chart to start scrolling continuously until the user provides input indicating the user wants the bar chart to stop scrolling. The user may cause the bar chart to scroll until a desired bar is in the display area. Once the desired bar is in the display area, the selection mechanism of FIG. 7 can be used to magnify the desired bar, unless the bar is in the fixed magnification area 300 at the end of the scrolling. In an alternative embodiment, the user may be able to scroll the fixed magnification area 300 and move it to a desired bar. If the scrolling causes the bar chart to reach an end of the chart, the chart stops scrolling since no new bars can be displayed by continuing the scrolling. The ends of the bar charts correspond to the smallest and the largest x-coordinate values for which the bar chart is intended to be displayed. Even though the scrolling is stopped when the user input causes the bar chart to scroll to an end of the bar chart, the user can cause the bar chart to scroll in the opposite direction.

Figure 9:
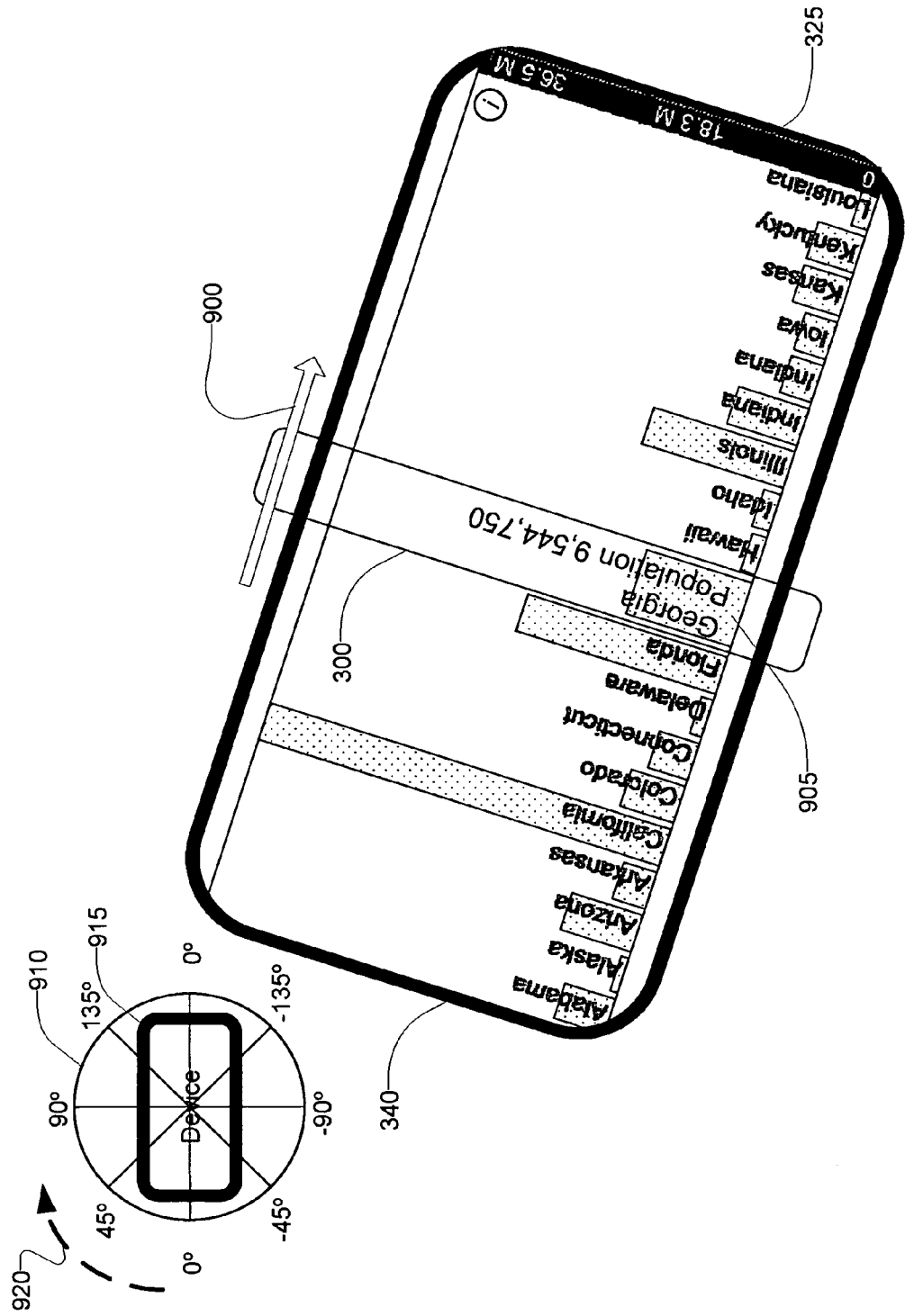
FIG. 9 shows how tilting a device displaying a bar graph in a particular direction causes the bar graph to scroll.
Figure 10:
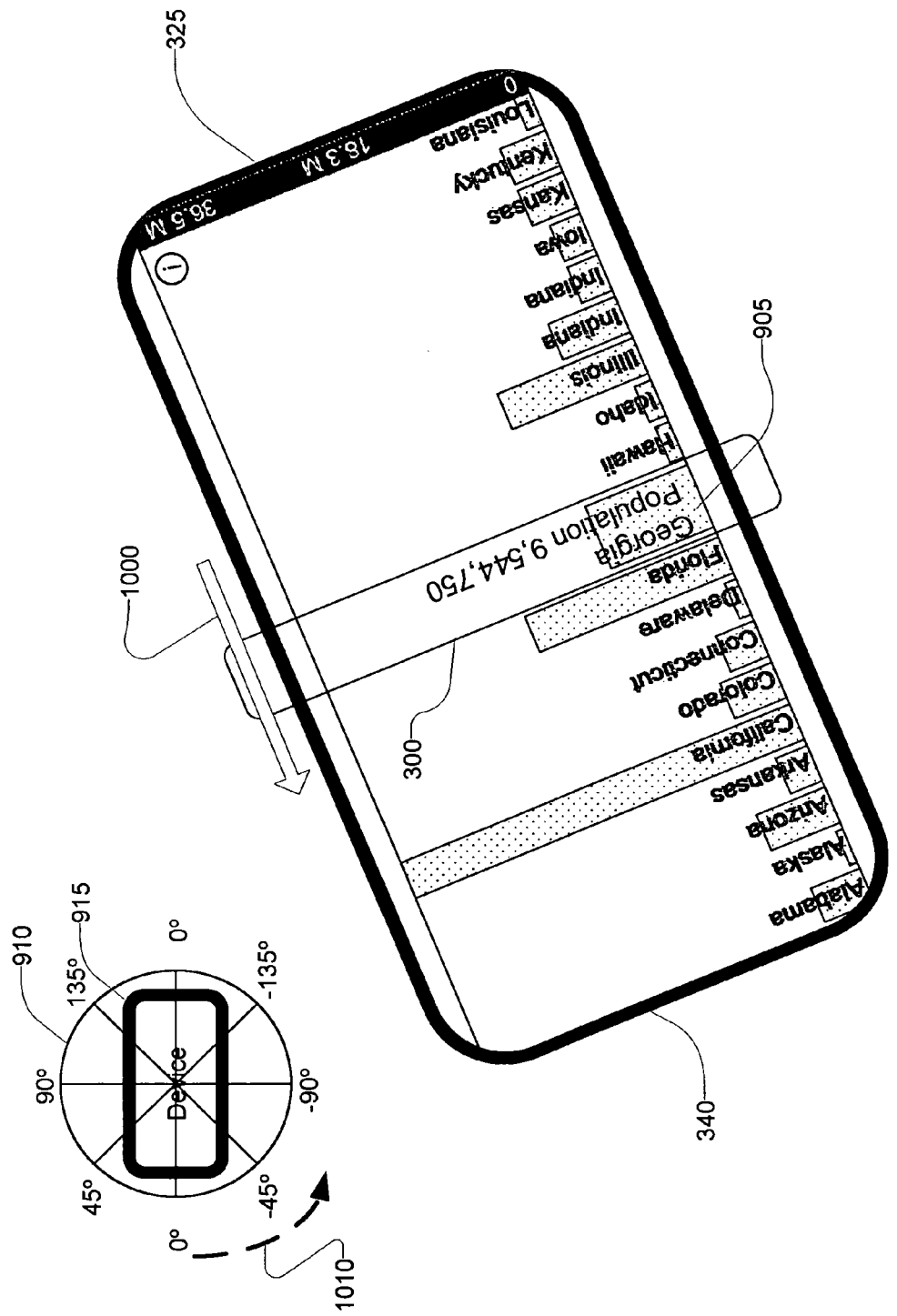
FIG. 10 shows how rotating a device in the direction opposite to that shown in FIG. 9 causes the bar graph to scroll in the opposite direction.

FIG. 9 illustrates an embodiment in which scrolling of the bar chart is controllable by tilting the display screen 225. The direction in which the bar chart scrolls is determined by the angle of tilt. The device 915 shown in FIG. 9 can be tilted along any of the angles drawn along the circle 910. The arrow 920 indicates that the angle of tilt is a positive angle less than 90°. As shown in the screenshot 340 of the display screen, the tilt may cause the left edge 340 to be higher than the right edge 325. The tilt at the angle illustrated by arrow 920 causes the direction of scrolling of the bar chart to be 900. As the bar chart keeps scrolling, the bars 905 displayed under the fixed magnification area 300 keep changing. The user may choose to change the angle to tilt back to 0° to stop the scrolling action. Once the scrolling stops, the desired bar may already be under the fixed magnification area 300 or be outside the fixed magnification area 300 but within the display area. This allows the user the select a desired bar within the display area to magnify it as illustrated in FIG. 7. FIG. 10 illustrates how the angle of tilt can be negative as shown by the arrow 1010 causing the bar chart to scroll in direction 1000, opposite to the direction 900.

In one embodiment, the speed of scrolling is determined by the magnitude of the angle of tilt. For example, in FIG. 9, if the angle of tilt 920 is selected to be 80°, the speed at which the bar chart scrolls is higher than the speed if the angle 920 was 10°. A user trying to reach a bar that is outside the display area and several bars away from the bars within the display area may start with a large angle of tilt to scroll fast towards the desired bar. The angle of tilt may be reduced as the desired bar gets closer to the display area. The angle of tilt is reduced to zero when the desired bar is within the display area causing the scrolling to stop. In certain embodiments, the speed at which the chart scrolls has a minimum or a maximum limit or both. For example, the smallest amount of tilt that is detected causes the chart to scroll at or above the minimum speed. Similarly, the maximum tilt, for example either 90° or −90°, does not cause the chart to scroll any faster than the maximum scrolling speed. The minimum and the maximum speed of scrolling of the chart can be predetermined for a system or configured by the user.

Figure 11:
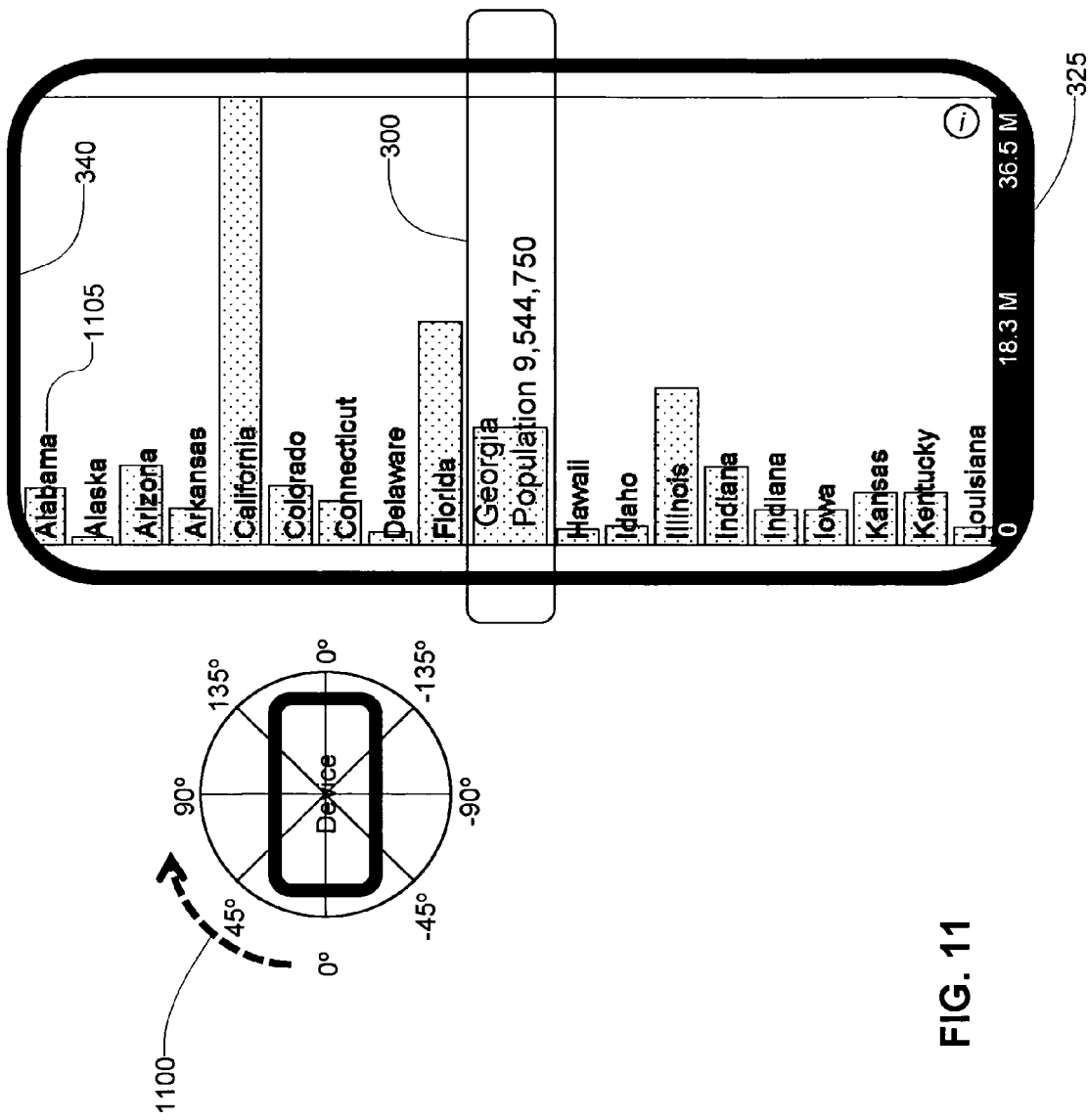
FIG. 11 shows how tilting a device displaying a bar graph at an angle of 90° causes the display to show the bars at the beginning of the x-axis.
Figure 12:
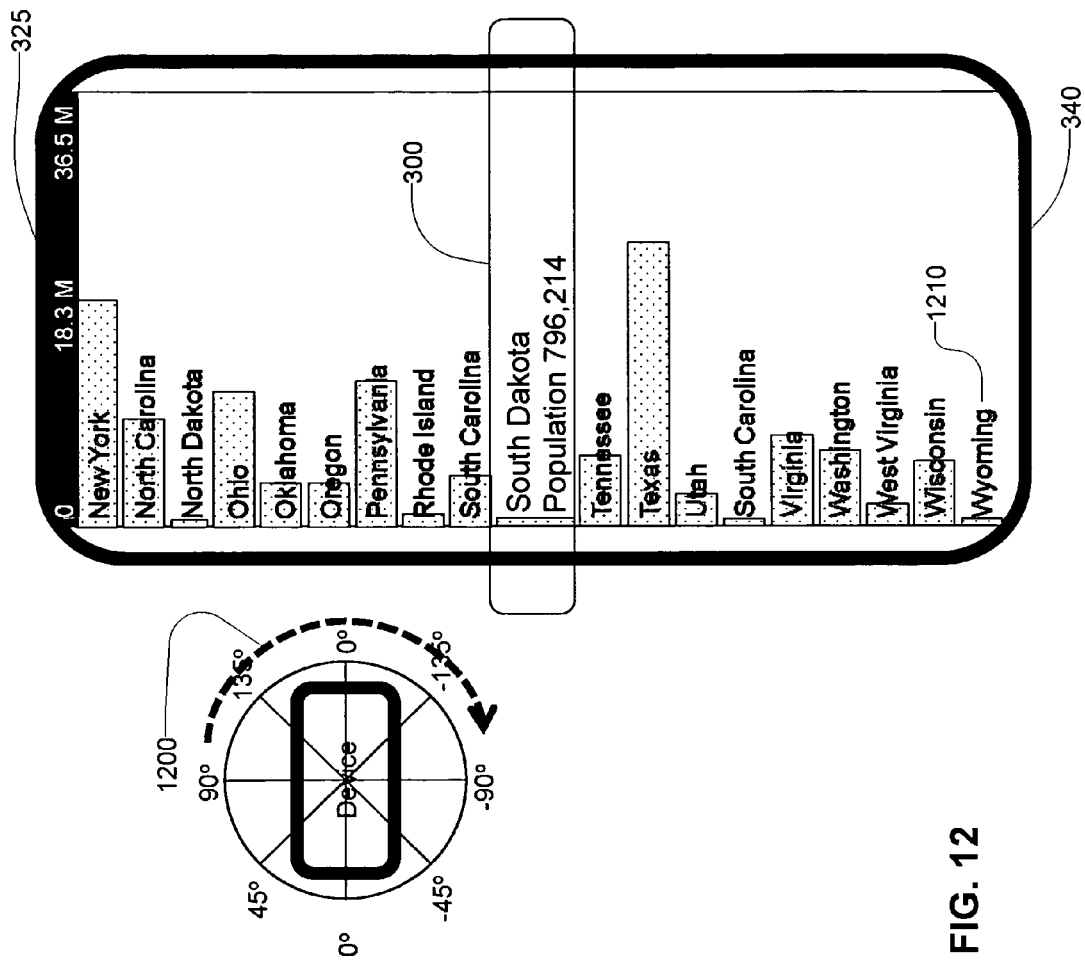
FIG. 12 shows how tilting a device displaying a bar graph at an angle of −90° causes the display to show the bars at the end of the x-axis.

As illustrated in FIG. 11, in certain embodiments, changing the angle of tilt 1100 to an angle within a predetermined range of angles close to 90° causes the bar chart to directly move to the beginning of the bar chart corresponding to the smallest x-coordinate value 1105 that needs to be displayed. As shown in FIG. 11, the bar corresponding to the smallest x-coordinate value 1105 is displayed adjacent to the left edge 340 and the fixed magnification area 300 is placed close to the middle of the bar chart being displayed. This behavior is an exception to the behavior described above, wherein the speed of scrolling of the bar chart is proportional to the magnitude of the angle. When the angle of tilt is large enough to be within a predetermined angle close to 90°, the user input causes the bar chart to directly move to the beginning of the bar chart instead of continuing to scroll. Similarly, as illustrated in FIG. 12, if the angle of tilt 1200 is within a predetermined range of angles close to −90°, the end of the bar chart is displayed with the bar 1200 corresponding to the largest x-coordinate value that needs to be displayed. Note that in the embodiment shown in FIG. 12, the bar 1210 corresponding to the largest x-coordinate value that needs to be displayed is shown adjacent to the right edge 340 with the fixed magnification area 300 shown in the middle of the left edge 325 and the right edge 340.

The data renderer 215 determines the dimensions of the chart to be displayed on the display screen 225. In one embodiment, when the data is to be displayed as a bar chart, the dimensions associated with the chart are calculated as follows. The minimum width SBwidth$_{min}$ of a standard bar 310 can be computed as:

$$SB\text{width}_{min} = \text{height}_{min\_font} + 2*M \quad (1)$$

In equation (1) height$_{min\_font}$ is the height of the smallest font size that can be used to display the data labels and M is the width of the margin above and below the text. Based on the computation of equation (1) a standard bar 310 can display the labels 305 corresponding to the values of the x-coordinates with a margin above and below the label. The width MBwidth of a magnified bar 315 displayed in the fixed magnification area 300 can be calculated as follows.

$$MB\text{width} = \text{height}_{display\_text} + 2*M \quad (2)$$

In equation (2) height$_{display\_text}$ is the height of the text displayed in the magnified bar and M is the width of the margin above and below the text. Since the information displayed in the magnified bar 315 is more than the information displayed in the standard bar 310, the text in a magnified bar 315 may be displayed on multiple lines as shown in FIG. 3. The height$_{display\_text}$ is the total height of the multi-line text displayed in a magnified bar 315. If a single magnified bar 315 is displayed in a fixed magnification area 300, the width of the fixed magnification area 300 is at least the width of a magnified bar 315. Alternatively, the fixed magnification area 300 is wide enough to display multiple magnified bars 315. The height or width of the area used to display the chart is determined by the dimensions of the display screen 225 less any predefined margins.

The x-axis in FIG. 3 is shown parallel to the bottom edge 350 and close to the bottom edge 350. The x-axis in FIG. 3 is close to the bottom edge because all the y-coordinate values corresponding to the bars are positive and are shown above the x-axis. In one embodiment, the maximum height of a bar is determined to be the same as the height of the area used to display the chart. The height Bheight$_x$ of any bar is determined by scaling the value appropriately based on the maximum height of the bars.

$$B\text{height}_x = \frac{\text{height}_{chart\_area}}{DP_{max}} * DP_x \quad (3)$$

In equation (3), the height$_{chart\_area}$ is the height of the chart area that corresponds to the maximum height of the bars, $DP_{max}$ is the value of the y-coordinate corresponding to the bar with maximum height, and $DP_x$ is the y-coordinate value corresponding to the bar for which the height Bheight$_x$ is being calculated.

If all the y-coordinate values corresponding to the bars are negative, all the bars have to be displayed below the x-axis. In this case, the x-axis may be displayed close to the top edge 345 of the display screen. The height of each bar is calculated by the following equation.

$$B\text{height}_x = \frac{\text{height}_{chart\_area}}{|DP_{min}|} * DP_x \quad (4)$$

The tallest bar corresponds to the minimum y-coordinate value $DP_{min}$. Since the $DP_{min}$ value is negative, equation (3) uses the absolute function, represented by $|DP_{min}|$ to compute a positive Bheight$_x$ value.

If the bar chart needs to display bars corresponding to both positive and negative y-coordinate values, some bar are displayed above the x-axis and some below the x-axis. In this case, the x-axis is displayed between the lower chart edge 355 and the upper chart edge 360 such that the bars can be displayed on either side of the x-axis. In one embodiment, the distance Xheight of the x-axis from the lower edge 355 is calculated based on equation (5):

$$Xheight = \frac{|DP_{min}| * height_{chart\_area}}{(|DP_{min}| + DP_{max})} \quad (5)$$

Essentially, the x-axis is displayed above the lower chart edge 355 such that the bar corresponding to y-coordinate value $DP_{min}$ can be displayed below the x-axis and the bar corresponding to the y-coordinate value $DP_{max}$ can be displayed above the x-axis. The height of a bar $Bheight_x$ in this case is calculated using the equation (6).

$$Bheight_x = \frac{DP_x * height_{chart\_area}}{(|DP_{min}| + DP_{max})} \quad (6)$$

Figure 13:
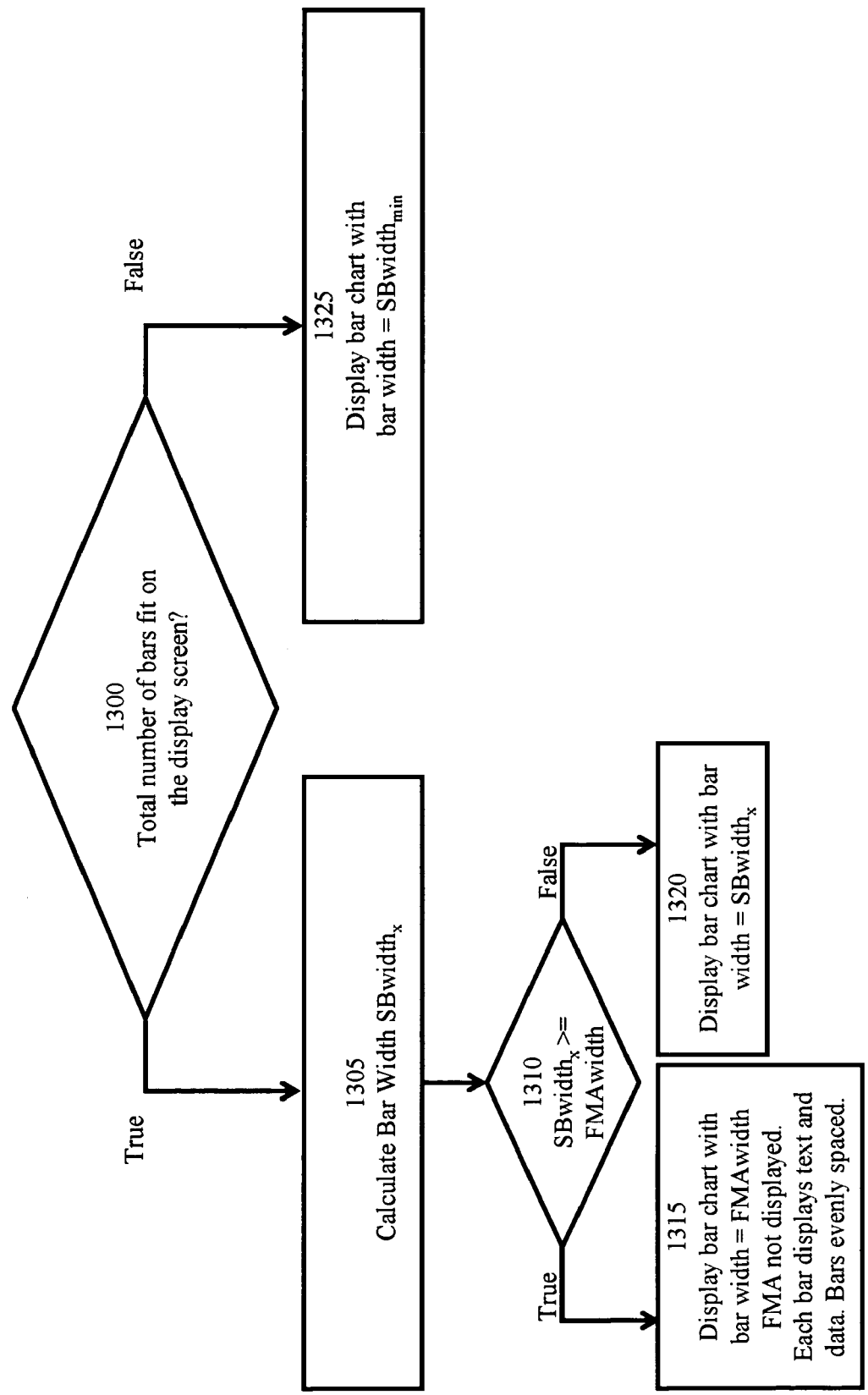
FIG. 13 shows a flowchart describing an embodiment of the process for calculating the bar width for displaying on a device with a fixed magnification area.

In certain embodiments, the bar chart may be displayed such that the x and the y axes are transposed. For bar charts with a large number of data points to be displayed, it may not be possible to display all the bars corresponding to the data points at the same time on the display screen 225. FIG. 13 shows the calculation of the number of bars displayed for a chart assuming the fixed magnification area 300 is wide enough to display a single magnified bar. The calculations presented can be extended to the case where the fixed magnification area 300 displays more than one magnified bar. First a determination 1300 is made, whether all the bars can be displayed. If one bar is displayed within the fixed magnification area 300, a determination 1300 is made if the remaining (num_dp−1) can be displayed as standard bars on the display screen 225 outside the fixed magnification area 300. Hence, all bars can be displayed if (num_dp−1) *$SBwidth_{min}$<=CHARTwidth−FMAwidth, where num_dp is the total number of data points, CHARTwidth is the total width of the chart that can be displayed on the display screen 225 at the same time, and FMAwidth is the width of the fixed magnification area 300. If it is determined that that the total number of bars cannot be displayed at the same time, the bar chart is displayed 1325 with a bar width of $SBwidth_{min}$. If, on the other hand, it is determined that all the bars can be displayed, the bar width is calculated 1305 using the following equation.

$$SBwidth_x = \frac{CHARTwidth - FMAwidth}{(num\_dp - 1)} \quad (7)$$

If it is further determined 1310, that the value of $SBwidth_x$ calculated by equation (7) is at least as large as FMAwidth, the width of the fixed magnification area 300, there is no need to display the fixed magnification area 300 since all bars can be displayed in a magnified form. In this case, all the bars are displayed evenly spaced. On the other hand, if it is determined 1310, that the value $SBwidth_x$ calculated by equation (7) is less than FMAwidth, the width of the fixed magnification area 300, the chart is displayed 1320 with the standard bar width $SBwidth_x$, since the available chart width is not big enough to show all bars as magnified. The fixed magnification area 300 is displayed in this case.

It is to be understood that the Figures and descriptions of the present invention have been simplified to illustrate elements that are relevant for a clear understanding of the present invention, while eliminating, for the purpose of clarity, many other elements found in a typical system that allows users to view report data. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a fixed magnification area through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method for displaying on a display screen of a mobile device a chart representing a plurality of data points, the method comprising:
   displaying a first set of data points on the display screen of the mobile device, each data point in the first set displayed having a fixed width and a height variable according to a value of the data point;
   displaying a second set of data points on the display screen of the mobile device, each data point in the second set displayed as magnified data points within a fixed magnification area of the display screen, the magnified data points having a width greater than the fixed width and a height variable according to a value of the data point and displaying additional information describing the magnified data points compared to data points from the first set;
   responsive to receiving a user input, causing the data points displayed on the screen to move, the moving causing a first data point in the first set to overlap with the fixed magnification area and a second data point in the second set to move out of the fixed magnification area; and
   altering the display of the first data point to be displayed as magnified data point having the width greater than the fixed width and displaying additional information describing the first data point, altering the second data point to have the fixed width, and reducing the amount of information displayed for the second data point.

2. The method of claim 1, wherein each data point has at least one associated label, and the label is not displayed for data points in the first set, and is displayed for data points in the second set.

3. The method of claim 1, wherein the fixed magnification area can be moved to occupy a different portion of the display screen.

4. The method of claim 1, wherein altering the display further comprises moving the fixed magnification area to incorporate the first data point.

5. The method of claim 1, wherein the chart is a bar chart, and the data points are bars of the bar chart.

6. The method of claim 5, wherein the second data set includes a single data point.

7. The method of claim 1, wherein the chart is a bar chart and the magnification area is a rectangular portion of the chart display area parallel to a bar displayed in the bar chart.

8. The method of claim 1, wherein the user input includes tilting the display screen.

9. The method of claim 8, wherein a rate at which the display is altered is dependent at least in part upon the degree of tilt of the display screen.

10. The method of claim 1, wherein the user input includes a swiping gesture across the display screen.

11. The method of claim 10, wherein a rate at which the display is altered is dependent at least in part upon a speed of the swiping gesture.

12. The method of claim 1, wherein the user input identifies the data points to be altered.

13. The method of claim 1, wherein altering the display further comprises moving at least some of the displayed data points from a first location on the display to a second location on the display.

14. The method of claim 2, wherein each label is displayed overlaid on its associated data point in the second set.

15. The method of claim 1, wherein the chart is a multi-series chart.

16. A method for displaying on a display screen of a mobile device a chart representing a plurality of data points, the method comprising:
   displaying a first set of data points on the display screen of the mobile device, each data point in the first set represented by a first image having a first size;
   displaying a second set of data points on the display screen of the mobile device, each data point in the second set displayed as magnified data points within a fixed magnification area of the display screen, the magnified data points represented by a second image having a second size greater than the first size and displaying an associated label, wherein the label is not displayed for the data points in the first set;
   responsive to receiving a user input, causing the data points displayed on the screen to move, the moving causing a first data point in the first set to overlap with the fixed magnification area and a second data point in the second set to move out of the fixed magnification area; and
   altering the display of the first data point to be displayed as a magnified data point represented by the second size and display the label, and altering the second data point to have the first size and not display the label.

17. A system for displaying on a display screen of a mobile device a chart representing a plurality of data points, the system comprising:
   a computer processor; and
   a computer-readable storage medium storing computer program modules configured to execute on the computer processor, the computer program modules comprising:
      an input/output driver module configured to:
         display a first set of data points on the display screen of the mobile device, each data point in the first set displayed having a fixed width and a variable height according to a value of the data point;
         display a second set of data points on the display screen, each data point in the second set displayed having a width greater than the fixed width and a variable height according to a value of the data point and displaying additional information describing the data points of the second set compared to data points from the first set;
         responsive to receiving a user input, causing the data points displayed on the screen to move, the moving causing a first data point in the first set to overlap with the fixed magnification area and a second data point in the second set to move out of the fixed magnification area; and
         alter the display of the first data point to have a width greater than the fixed width, and alter the second data point to have the fixed width.

18. A computer program product having a non-transitory computer-readable storage medium storing computer-executable code for displaying on a display screen of a mobile device a chart representing a plurality of data points, the code comprising:

an input/output driver module configured to:

display a first set of data points on the display screen of the mobile device, each data point in the first set displayed having a fixed width and a variable height according to a value of the data point;

display a second set of data points on the display screen of the mobile device, each data point in the second set displayed as magnified data points within a fixed magnification area of the display screen, the magnified data points having a width greater than the fixed width and a variable height according to a value of the data point and display additional information describing the magnified data points compared to data points from the first set;

responsive to receiving a user input, cause the data points displayed on the screen to move, the moving causing a first data point in the first set to overlap with the fixed magnification area and a second data point in the second set to move out of the fixed magnification area; and alter the display of the first data point to be displayed as magnified data point having the width greater than the fixed width, alter the second data point to have the fixed width, and reduce the amount of information displayed for the second data point.

19. The method of claim 8, wherein responsive to the angle of tilt being substantially close to a right angle, the display is altered to display data points at the end of the chart instead of continuing scrolling of the chart.

20. The method of claim 1, further comparing:

comparing the total number of data points of the chart with a threshold number such that: responsive to the total number of data points exceeding the threshold number the data points are displayed as the second set of data points within the fixed magnification area and the first set of data points outside the fixed magnification area, and responsive to the total number of data points being below the threshold number, all data points displayed have the greater width.

21. The system of claim 17, wherein each data point has at least one associated label, and the label is not displayed for data points in the first set, and is displayed for data points in the second set.

22. The system of claim 17, wherein altering the display further comprises moving the fixed magnification area to incorporate the first data point.

23. The system of claim 17, wherein the chart is a bar chart and the magnification area is a rectangular portion of the chart display area parallel to a bar displayed in the bar chart.

24. The system of claim 17, wherein the user input includes a swiping gesture across the display screen.

25. The system of claim 17, wherein the chart is a multi-series chart.

26. The computer program product of claim 18, wherein each data point has at least one associated label, and the label is not displayed for data points in the first set, and is displayed for data points in the second set.

27. The computer program product of claim 18, wherein altering the display further comprises moving the fixed magnification area to incorporate the first data point.

28. The computer program product of claim 18, wherein the chart is a bar chart and the magnification area is a rectangular portion of the chart display area parallel to a bar displayed in the bar chart.

29. The computer program product of claim 18, wherein the user input includes a swiping gesture across the display screen.

30. The computer program product of claim 18, wherein the chart is a multi-series chart.

* * * * *